US00RE50703E

(19) United States
(12) Reissued Patent
Eustace et al.

(10) Patent Number: US RE50,703 E
(45) Date of Reissued Patent: Dec. 16, 2025

(54) POLYMER COMPOSITION

(71) Applicant: MITSUBISHI CHEMICAL UK LIMITED, Billingham (GB)

(72) Inventors: Paul Eustace, Teeside (GB); Brian McMahon, Tyne and Wear (GB)

(73) Assignee: MITSUBISHI CHEMICAL UK LIMITED, Billingham (GB)

(21) Appl. No.: 18/198,430

(22) Filed: May 17, 2023

Related U.S. Patent Documents

Reissue of:
(64) Patent No.: 11,370,907
Issued: Jun. 28, 2022
Appl. No.: 16/483,128
PCT Filed: Feb. 5, 2018
PCT No.: PCT/GB2018/050326
§ 371 (c)(1),
(2) Date: Aug. 2, 2019
PCT Pub. No.: WO2018/142164
PCT Pub. Date: Aug. 9, 2018

(30) Foreign Application Priority Data

Feb. 3, 2017 (GB) ..... 1701817

(51) Int. Cl.
*C08L 33/12* (2006.01)
*B32B 27/08* (2006.01)
*B32B 27/30* (2006.01)
*C08F 220/14* (2006.01)
*C08K 5/20* (2006.01)

(52) U.S. Cl.
CPC ..... *C08L 33/12* (2013.01); *B32B 27/08* (2013.01); *B32B 27/302* (2013.01); *B32B 27/308* (2013.01); *C08F 220/14* (2013.01); *C08K 5/20* (2013.01); *B32B 2250/246* (2013.01); *B32B 2307/546* (2013.01); *B32B 2307/558* (2013.01); *B32B 2307/584* (2013.01)

(58) Field of Classification Search
CPC ..... C08L 33/12; B32B 27/08; B32B 27/308; C08K 5/20
See application file for complete search history.

(56) References Cited

U.S. PATENT DOCUMENTS

| | | | | |
|---|---|---|---|---|
| 2007/0191589 | A1* | 8/2007 | Hirota | C08L 53/00 528/502 R |
| 2011/0088843 | A1 | 4/2011 | Wake et al. | B29C 66/1142 156/309.9 |
| 2012/0270965 | A1* | 10/2012 | Kim | C08F 279/02 523/122 |
| 2013/0183536 | A1 | 7/2013 | Kaneda et al. | |
| 2018/0044517 | A1* | 2/2018 | Ozawa | C08L 33/12 |

FOREIGN PATENT DOCUMENTS

| | | | | |
|---|---|---|---|---|
| EP | 515092 | A2 * | 11/1992 | B29C 33/62 |
| EP | 2415835 | A1 | 2/2012 | |
| EP | 2840109 | A1 | 2/2015 | |
| JP | H02274747 | A | 11/1990 | |
| JP | H0428748 | A | 1/1992 | |
| JP | H05140384 | A | 6/1993 | |
| JP | H05279537 | A | 10/1993 | |
| JP | H10128921 | A | 5/1998 | |
| JP | 2000025181 | A | 1/2000 | |
| JP | 2001049072 | A | 2/2001 | |
| JP | 2004285150 | A | 10/2004 | |
| JP | 2006143945 | A | 6/2006 | |
| JP | 2006205478 | A | 8/2006 | |
| JP | 2010111784 | A | 5/2010 | |
| JP | 2015131948 | A | 7/2015 | |
| JP | 2016143713 | A | 8/2016 | |
| JP | 2016175290 | A | 10/2016 | |
| JP | 2021102755 | A | 7/2021 | |
| KR | 20130087070 | A | 8/2013 | |
| WO | 2004099394 | A2 | 11/2004 | |
| WO | WO-2007039421 | A1 * | 4/2007 | B32B 27/08 |
| WO | 2007135344 | A1 | 11/2007 | |
| WO | 2010072592 | A1 | 7/2010 | |
| WO | WO-2011081317 | A2 * | 7/2011 | C08F 279/02 |
| WO | WO-2014156032 | A1 * | 10/2014 | C08L 33/12 |

(Continued)

OTHER PUBLICATIONS

The Examiner's Report issued in corresponding Canadian Patent Application No. 3,051,138; Dated: Oct. 12, 2023.
The Examination Report issued in corresponding European Patent Application No. 18 703 850.0-1102; Dated: Apr. 30, 2024.
An Office Action issued in corresponding Japanese Patent Application No. 2019-542112; Dated: Jun. 1, 2022 and the English translation of the same.
An Office Action issued in corresponding Japanese Patent Application No. 2022-161385; Mailing Date: Dec. 5, 2023.
Computer-generated English-language translation of WO 2014/156032 A1.*
The International Preliminary Report on Patentability issued in corresponding International Application No. PCT/GB2018/050326; dated Aug. 15, 2019.
An Office Action issued in Corresponding Russia Patent Application No. 2019127549/04(054071); dated Apr. 6, 2021.

(Continued)

*Primary Examiner* — Joseph R Kosack
(74) *Attorney, Agent, or Firm* — Chrisman Gallo Tochtrop LLC

(57) ABSTRACT

The invention relates to a composition with improved scratch and/or abrasion resistance and methods of their manufacture. Compositions for injection moulding, extrusion, (co)extrusion and/or thermoforming are described. The composition comprises (a) an acrylic (co)polymer and (b) a fatty acid amide. At least 30 wt % of the acrylic (co)polymer residues are residues of an alkacrylic acid or ester monomer such as methyl methacrylate and 0 to 70 wt % are residues of one or more other vinyl comonomers. A process for the production of a composition comprising the steps of melt blending the fatty acid amide with the acrylic (co)polymer or adding the fatty acid amide to the monomer during production of the acrylic (co)polymer. Use of the composition may be in injection moulding, extrusion or co-extrusion. Co-extruded laminates comprising a cap layer of the composition are also described.

25 Claims, No Drawings

(56) References Cited

FOREIGN PATENT DOCUMENTS

| | | | |
|---|---|---|---|
| WO | 2015044137 | A1 | 4/2015 |
| WO | 2014171504 | A1 | 2/2017 |

OTHER PUBLICATIONS

An Office Action dated Nov. 24, 2021 issued in corresponding Japanese Application No. 2019-542112.

* cited by examiner

POLYMER COMPOSITION

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

FIELD

The present invention relates to a composition with improved scratch and/or abrasion resistance and methods of manufacture thereof. More specifically, the present invention relates to such compositions for injection moulding, extrusion, (co)extrusion and/or thermoforming.

BACKGROUND

Acrylic (co)polymers have exceptional optical clarity, excellent weatherability, toughness, stability and aesthetic characteristics and are employed in a wide range of application areas such as optical (glazing/lenses), lighting, transport (automotive), building and construction, healthcare (medical), electronics and electrical (E&E), display and household (furniture), signage and sanitaryware.

In some application areas where these properties are important and/or retention of these properties, following exposure to sunlight, UV radiation etc. is beneficial, acrylic (co)polymers are also exploited as a co-extruded, protective coating layer to impart these attractive and improved properties to underlying substrate plastics and other materials.

A number of the above applications require materials which exhibit excellent surface hardness and good scratch and/or abrasion resistance and even though acrylic (co) polymers are considered to be one of the leading thermoplastics in this respect, products with improved scratch and/or abrasion resistance that still retain the other attractive properties and processability of such acrylic (co)polymers are highly sought after.

The use of a crosslinked 'hard' coat layer to impart enhanced scratch and/or abrasion resistance to thermoplastic polymers is well known, however, this requires additional downstream processing steps which add significant cost to the overall production process. The approach also has the added disadvantage, in that once the coating is applied, no further melt processing or shaping of the coated article can be carried out without damaging the coating (WO2015044137, EP2840109).

Scratch resistant additives are known and include alumina in a water based dispersion for use in vinyl flooring; nanoscale silicate additives for acrylic matrix; grafted calcium carbonate for polystyrene; nanoscale talc for improved scratch and barrier properties; polyamide-12 for polypropylene; wollastonite filled polymer for improved scratch resistance and branched, saturated, primary fatty acid amide in polyolefin and polystyrene polymers.

Although some additives are known to be effective in acrylic (co)polymers such as siloxanes they are known to suffer from processing problems and there is a need for further additives to improve scratch resistance without suffering from these drawbacks.

It would be beneficial to provide additives that could improve the scratch and/or abrasion resistance of acrylic (co)polymers and thereby compositions comprising such (co)polymers.

It is an objective of aspects of the present invention to address one or more of the abovementioned or other problems.

SUMMARY

According to a first aspect of the present invention there is provided a composition comprising:

(a) an acrylic (co)polymer and (b) a fatty acid amide wherein at least 30 wt % of the acrylic (co)polymer residues are residues of an alkacrylic acid or ester monomer and 0 to 70 wt % are residues of one or more other vinyl comonomers and wherein the composition is free from copolymers of ethylene and at least 1 type of vinyl monomer other than such a copolymer that is an ethylene alpha olefin copolymer rubber or ethylene alpha olefin nonconjugated diene copolymer rubber.

The fatty acid amide and acrylic (co)polymer may be compounded, typically, melt blended or the amide may be added to the polymer during the polymer production either pre-, during or post-polymerisation.

In compounding, the amide may be added directly to the acrylic (co)polymer at the final processing (extrusion/injection moulding/co-extrusion) stage of the composition or at an earlier stage in the production of pellets or chips and in either case it may be included via masterbatch. For the avoidance of doubt, references to compounding, blended or melt blended or the like herein optionally incorporate a tumble blending phase prior to the necessary compounding, blending or melt blending phase. The compounding or melt blending may comprise melt processing a mixture of the fatty acid amide and the acrylic (co)polymer through an extruder, suitably to form pellets or chips.

Alternatively, the amide may be added during the polymer production such as during suspension polymerisation, bulk polymerisation, emulsion or solution polymerisation.

According to a second aspect of the present invention, there is provided a process for the production of a composition according to the first aspect of the present invention comprising the steps:

a. melt blending the fatty acid amide with the acrylic (co)polymer or
b. adding the fatty acid amide to the monomer during production of the acrylic (co)polymer.

For the avoidance of doubt, the amide may be added to monomer in suspension, solution, emulsion or in bulk polymerisation form.

According to a third aspect of the present invention there is provided an acrylic chip or pellet for injection moulding, extrusion or co-extrusion comprising a composition according to the first aspect of the present invention.

The composition, chip or pellet of the present invention may be for injection moulding, extrusion, and/or co-extrusion. As such, according to a fourth aspect of the present invention there is provided the use of the composition of the first aspect of the present invention in injection moulding, extrusion or co-extrusion.

According to the fifth aspect of the present invention, there is provided a process for the production of a moulded article comprising the step:

injection moulding, extruding or co-extruding a composition according to the first aspect of the present invention to form a moulded article.

For the avoidance of doubt, the process of production of the moulded article may include vacuum forming or vacuum forming may be carried out subsequently.

Co-extrusion may comprise co-extruding a composition according to the first aspect of the present invention as one or more cap layers on a substrate, suitably the substrate is formed from a composition comprising acrylonitrile butadiene styrene resin (ABS); polyvinyl chloride (PVC); polycarbonate (PC); polystyrene (PS), such as high impact polystyrene (HIPS); styrene-acrylonitrile resin (SAN); polyethylene terephthalate glycol modified (PETG); polyethylene terephthalate (PET); styrene methyl methacrylate (SMMA); polylactic acid (PLA); polycarbonate (PC)/ABS; PC/PET; PC/polybutylene terephthalate (PBT); Acrylic/PVC and/or acrylic resin. The substrate may itself be mutilayered. Where there are two cap layers they may be located on either side of the substrate layer. For example, the substrate layer may be ABS or an acrylic resin such as PMMA or the substrate layer may be multi-layered with for example an ABS layer and an acrylic resin such as PMMA on one or both sides thereof. The acrylic resin of the substrate if present may be in accordance with the acrylic (co)polymer of the invention but it may also be free of fatty acid amide. In any case, the composition of the acrylic resin substrate will generally be different from the cap layer of the invention.

According to the sixth aspect of the present invention, there is provided a moulded acrylic article comprising a composition according to the first aspect of the present invention.

Suitably the moulded acrylic article is an injection moulded, extruded or co-extruded acrylic article. Preferably, the co-extruded article comprises a substrate layer and a cap layer, wherein the cap layer is formed from a composition according to the first aspect.

A cap layer may have a thickness of at least 50 μm, or at least 80 μm, for example at least 100 μm, such as at least 180 μm, 200 μm, 220 μm, 240 μm, 250 μm, 300 μm, 350 μm, 400 μm, 450 μm, 500 μm, 600 μm, 700 μm, 800 μm, 900 μm or 1 mm. Generally, the cap layer is less than 1 mm thickness.

Acrylic (Co)Polymer

The acrylic (co)polymer of any aspect of the present invention may be present in the composition in an amount of between 10 and 99.9% by weight of the composition, chip, pellet or moulded article or cap layer, preferably between 20 and 99.5 wt %. Typically, the acrylic (co)polymer forms at least, 25, 35, 45, 50, 55, 65, 70, 73, 75, 77, 80, 83, 85, 86, 87, 88, 89, 90, 91, 92, 93, 94, 95, 96, 97, 98, 99 or 99.5 wt % of the composition. For example, between 30 and 99.25 wt %, between 40 and 99 wt %, between 50 and 98.5 wt %, between 60 and 98.25 wt %, between 70 and 98 wt %, between 75 and 97.5 wt %, between 80 and 97 wt %, between 85 and 95 wt % or between 85 and 90 wt %.

The acrylic (co)polymer of the present invention may be a blend or mixture of two or more acrylic (co)polymers which may be the same or different both in terms of (co)monomers, (co)monomer ratio and molecular weight. Preferably, however, the acrylic (co)polymer of the present invention is a single acrylic (co)polymer.

The acrylic (co)polymer generally forms all the polymer present in the composition chip, pellet or moulded article or cap layer. Specifically, the acrylic (co)polymer may form 95-100% w/w of the total polymer in the composition, chip, pellet or moulded article or cap layer, more typically, 98-100% w/w of the said total polymer, most typically, 99-100% w/w thereof, for example 99.1, 99.2, 99.3, 99.4, 99.5, 99.6, 99.7, 99.8, 99.9 or 100% w/w of the total polymer present in the composition, chip, pellet or moulded article or cap layer.

The weight average molecular weight (Mw) of the acrylic (co)polymer of any aspect of the present invention is typically between 50,000 daltons and 5,000,000 daltons, more typically, between 60,000 daltons and 4,000,000 daltons, between 60,000 daltons and 3,000,000 daltons, between 60,000 daltons and 2,000,000 daltons, preferably, between 65,000 and 1,000,000 daltons, for instance, between 70,000 and 600,000 daltons.

The weight average molecular weight (Mw) of a melt processable acrylic (co)polymer of any aspect of the present invention is typically between 50,000 daltons and 250,000 daltons, more typically, between 60,000 daltons and 200,000 daltons, preferably, between 65,000 and 150,000 daltons or between 70,000 and 150,000 daltons.

The weight average molecular weight (Mw) of the acrylic copolymer may be determined by techniques well known to those skilled in the art, for example gel permeation chromatography. The Mw of a polymeric material may be determined by using gel permeation chromatography using appropriate standards, solvents, columns and detectors.

The melt flow index of the melt processable acrylic (co)polymer of any aspect of the present invention, and typically of the composition, chip or pellet, may be between 0.1 and 40 g/10 min, such as between 0.5 and 35 g/10 min, preferably between 0.6 and 30 g/10 min and more preferably between 0.8 and 25 g/10 min, especially between 1 and 10 g/10 min.

The melt flow index (MFI) of a polymeric material as defined herein is measured at 230° C. in accordance with ISO 1133:2011. The polymeric material for testing is manufactured using a twin screw extruder and then preconditioned in a vacuum oven at 80° C. for 24 hours prior to testing. The material is loaded into the barrel of a rheometer heated at 230° C. and having a die of diameter 2.095 mm. The nominal length of the die is 8.000 mm. The loaded rheometer is allowed to equilibrate for 10 mins and then a load of 3.8 kg/cm$^3$ applied to the piston. The units for MFI are quoted in g/10 min.

The Vicat softening point of the acrylic (co)polymer of any aspect of the present invention, and typically of the composition, chip or pellet, may be between 60 and 150° C., such as between 70 and 130° C., for example between 75 and 120° C. A suitable method of measuring Vicat softening temperature is ISO 306B:2013 Fifth Edition.

Alkyl Alkacrylate or Alkacrylic Acid Monomer

The acrylic (co)polymer of any aspect of the present invention comprises at least 30 wt % of residues that are residues of an alkacrylic acid or ester monomer and 0 to 70 wt % other vinyl comonomer residues. Preferably, more than 50 wt % of the residues of the acrylic (co)polymer are residues of an alkacrylic acid or ester monomer, more preferably, at least 55, 60, 65, 70 or 75 wt %, such as at least 80, 90, 91, 92, 93, 94, 95, 96, 97, 98 or 99 wt % or 100 wt % are residues of an alkacrylic acid or ester monomer and upto 70 wt % such as upto less than 50, or up to 45, 40, 35, 30, 25, 20, 15, 10, 9, 8, 7, 6, 5, 4, 3, 2 or 1 wt % or 0 wt % are residues of other vinyl comonomers. Preferably, the acrylic (co)polymer is a crosslinked, partly cross-linked or non-crosslinked acrylic (co)polymer, more preferably, a non-crosslinked acrylic (co)polymer. Partly cross-linked acrylic (co)polymer may have upto 5 w/w % crosslinker.

The alkacrylic acid or ester monomer may be selected from optionally substituted aliphatic alkacrylate esters, including optionally substituted alicyclic alkacrylate esters, or optionally substituted aryl alkacrylate esters or ($C_1$-$C_{10}$) alkacrylic acid. Preferably, the alkacrylic acid or ester monomer is selected from optionally substituted alkyl alkacrylate, such as ($C_1$-$C_{22}$)alkyl ($C_1$-$C_{10}$)alkacrylate, or ($C_1$-$C_{10}$) alkacrylic acid. Examples of $C_1$-$C_{22}$ alkyl groups of the alkyl alkacrylates include methyl, ethyl, n-propyl, n-butyl, iso-butyl, tert-butyl, iso-propyl, pentyl, hexyl, cyclohexyl, 2-ethyl hexyl, heptyl, octyl, nonyl, decyl, isodecyl, undecyl, dodecyl, tridecyl, tetradecyl, pentadecyl, hexadecyl, heptadecyl, octadecyl, nonadecyl, eicosyl, behenyl, and isomers thereof. The alkyl group may be straight or branched chain. Preferably, the ($C_1$-$C_{22}$)alkyl group represents a ($C_1$-$C_{12}$) alkyl group or ($C_1$-$C_8$)alkyl group as defined above, more preferably a ($C_1$-$C_6$)alkyl group as defined above, even more preferably a ($C_1$-$C_4$)alkyl group as defined above. Examples of ($C_{1-10}$)alk groups of the ($C_1$-$C_{10}$)alkacrylic acid or ester monomer residue include methyl, ethyl, n-propyl, iso-propyl, n-butyl, iso-butyl, tert-butyl, pentyl, hexyl, cyclohexyl, 2-ethyl hexyl, heptyl, octyl, nonyl, decyl and isomers thereof. The alk groups may be straight or branched chain. Preferably, the ($C_1$-$C_{10}$)alk group represents a ($C_1$-$C_6$)alk group as defined above, more preferably a ($C_1$-$C_4$)alk group as defined above, even more preferably a methyl group.

Suitably, the alkacrylic acid or ester monomer residue is a residue of ($C_1$-$C_8$)alkyl or ($C_5$-$C_{12}$)cycloalkyl ($C_1$-$C_4$) alkacrylate or ($C_1$-$C_4$)alkacrylic acid, preferably, a residue of ($C_1$-$C_8$)alkyl ($C_1$-$C_4$)alkacrylate, more preferably of ($C_1$-$C_8$)alkyl methacrylate. Examples of ($C_1$-$C_8$)alkyl methacrylate include: methyl methacrylate, ethyl methacrylate, n-propyl methacrylate, isopropyl methacrylate, n-butyl methacrylate, isobutyl methacrylate, t-butyl methacrylate, pentyl methacrylate, n-hexyl methacrylate, cyclohexyl methacrylate, 2-ethylhexyl methacrylate, heptyl methacrylate, octyl methacrylate and combinations thereof.

Suitably, the alkacrylic acid or ester monomer residue is a residue of ($C_1$-$C_4$)alkyl methacrylate, most preferably of a ($C_1$-$C_3$)alkyl methacrylate. Preferably, the alkacrylic acid or ester monomer residue is selected from a residue of methyl methacrylate, ethyl methacrylate, n-propyl methacrylate, iso-propyl methacrylate, n-butyl methacrylate, isobutyl methacrylate, tert-butyl methacrylate. Preferably, the alkacrylic acid or ester monomer residue is selected from a residue of methyl methacrylate, ethyl methacrylate, n-propyl methacrylate, and iso-propyl methacrylate, most preferably methyl methacrylate.

Vinyl Comonomer

The other vinyl comonomer residues may be present in the acrylic (co)polymer in an amount of between 0 and 70% by weight of the acrylic (co)polymer, such as between 0 and less than 50 wt %. Preferred ranges are between 1 and 25 or 20 or 15, 14, 13, 12, 11, 10, 9, 8, 7, 6 or 5 wt % or between 1 and 9 wt % or 1 and 8 wt %, or 2 and 8 wt % or 2 and 4 wt %.

The other vinyl comonomers may be selected from one or more further alkacrylic acid and/or ester and/or acrylic acid and/or ester. For example, the vinyl comonomers may be selected from optionally substituted aliphatic, including optionally substituted alicyclic, or optionally substituted aryl (alk)acrylate esters or (($C_0$-$C_{10}$)alk)acrylic acid. The vinyl comonomer may be selected from optionally substituted alkyl (alk)acrylate, for example ($C_1$-$C_{22}$)alkyl (($C_0$-$C_{10}$)alk) acrylate or (($C_0$-$C_{10}$)alk)acrylic acid, such as methyl methacrylate, ethyl methacrylate, methyl acrylate, ethyl acrylate, n-butyl acrylate, iso-butyl acrylate, n-butyl methacrylate, iso-butyl methacrylate, hexyl methacrylate, hexyl acrylate, 2-ethylhexyl methacrylate, 2-ethylhexyl acrylate, lauryl methacrylate, lauryl acrylate, stearyl methacrylate, stearyl acrylate or methacrylic acid or acrylic acid; carboxyl functional (alk)acrylates such as 2-carboxyethylacrylate; hydroxyl-functional (alk)acrylates such as 2-hydroxyethyl methacrylate, hydroxypropylmethacrylate, hydroxypropylethyl methacrylate, 2-hydroxyethyl acrylate, or hydroxypropyl acrylate; sulpho and sulpho ester or sulphonyl functional (alk)acrylates such as 2-sulphoethylmethacrylate; amino functional (alk)acrylates such as N'N-dimethylaminoethyl methacrylate, N-t-butylaminoethyl methacrylate, N',N-diethylaminoethyl methacrylate; epoxy functional (alk)acrylates such as glycidyl methacrylate; 1-(2-methacryloxyethyl) imidazolidin-2-one; or acetoacetoxy functional (alk) acrylates such as 2-aceto acetoxy ethylmethacrylate; carboxylic acids such as crotonic, fumaric, maleic and itaconic acid; vinyl compounds such as styrene, alphamethylstyrene, vinyl pyrrolidone, vinyl pyridine, vinyl acetate, monomethyl maleate, monomethyl itaconate, monobutyl maleate, α-Methylene-γ-butyrolactone and maleic anhydride; and compatible crosslinking monomers such as allyl methacrylate, divinyl benzene, ethylene glycol dimethacrylate, ethylene glycol diacrylate, 1,4-butanediol dimethacrylate, 1,4-butanediol diacrylate, 1,6-hexanediol dimethacrylate or 1,6-hexanediol diacrylate. Preferably, the vinyl comonomer is selected from one or more of ($C_1$-$C_{22}$)alkyl (($C_0$-$C_{10}$)alk)acrylate, (($C_0$-$C_{10}$)alk)acrylic acid, styrene, maleic anhydride or vinyl pyrrolidone. More preferably an ($C_1$-$C_{22}$)alkyl (($C_0$-$C_{10}$)alk)acrylate or (($C_0$-$C_{10}$)alk)acrylic acid.

The (alk)acrylic acid or ester comonomers may be selected from (($C_0$-$C_{10}$)alk)acrylic acid or ester monomers, such as from ($C_1$-$C_{22}$)alkyl (($C_0$-$C_{10}$)alk)acrylate or (($C_0$-$C_{10}$)alk)acrylic acid monomers. Examples of $C_1$-$C_{22}$ alkyl groups of the alkyl (alk)acrylates include methyl, ethyl, n-propyl, n-butyl, iso-butyl, tert-butyl, iso-propyl, pentyl, hexyl, cyclohexyl, 2-ethyl hexyl, heptyl, octyl, nonyl, decyl, isodecyl, undecyl, dodecyl, tridecyl, tetradecyl, pentadecyl, hexadecyl, heptadecyl, octadecyl, nonadecyl, eicosyl, behenyl, and isomers thereof. The alkyl group may be straight or branched chain. Preferably, the ($C_1$-$C_{22}$)alkyl group represents a ($C_1$-$C_{12}$)alkyl group or ($C_1$-$C_8$)alkyl group as defined above, more preferably a ($C_1$-$C_6$)alkyl group as defined above, even more preferably a ($C_1$-$C_4$)alkyl group as defined above. Examples of ($C_{0-10}$)alk groups of the alkyl (alk) acrylate or (($C_0$-$C_{10}$)alk)acrylic acid monomer residue include methyl, ethyl, n-propyl, iso-propyl, n-butyl, iso-butyl, tert-butyl, pentyl, hexyl, cyclohexyl, 2-ethyl hexyl, heptyl, octyl, nonyl, decyl and isomers thereof as well as H to represent acrylate ester and acrylic acid. The alk groups may be straight or branched chain. Preferably, the ($C_0$-$C_{10}$) alk group represents a ($C_0$-$C_6$)alk group as defined above, more preferably a ($C_0$-$C_4$) alk group as defined above, even more preferably a methyl group.

Suitably, the other vinyl comonomer residues are residues of one or more ($C_1$-$C_5$)alkyl or ($C_5$-$C_{12}$)cycloalkyl (($C_0$-$C_4$) alk)acrylate or (($C_0$-$C_4$)alk) acrylic acid, preferably, a residue of ($C_1$-$C_8$)alkyl (($C_0$-$C_4$)alk)acrylate, more preferably of ($C_1$-$C_8$)alkyl or ($C_5$-$C_{12}$) cycloalkyl(meth)acrylate. Examples of ($C_1$-$C_8$)alkyl or ($C_5$-$C_8$) cycloalkyl (meth) acrylate include the alkyl methacrylates: methyl methacrylate, ethyl methacrylate, n-propyl methacrylate, isopropyl methacrylate, n-butyl methacrylate, isobutyl methacrylate, tert-butyl methacrylate, pentyl methacrylate, n-hexyl methacrylate, cyclohexyl methacrylate, isobornyl methacrylate, 2-ethylhexyl methacrylate, heptyl methacrylate, octyl methacrylate and the alkyl acrylates: methyl acrylate, ethyl acrylate, n-propyl acrylate, isopropyl acrylate, n-butyl acrylate, isobutyl acrylate, tert-butyl acrylate, pentyl acrylate, n-hexyl acrylate, cyclohexyl acrylate, isobornyl acrylate, 2-ethylhexyl acrylate, heptyl acrylate and octyl acrylate and combinations thereof. A preferred example of (($C_0$-$C_4$)alk) acrylic acid is methacrylic acid Suitably, the other vinyl comonomer residues are residues of ($C_1$-$C_4$)alkyl (meth)acrylate, preferably of ($C_1$-$C_4$)alkyl acrylate, more preferably ($C_1$-$C_3$)alkyl acrylate. Preferably, the vinyl comonomer residue is selected from a residue of methyl (meth)acrylate, ethyl (meth)acrylate, n-propyl (meth)acrylate, iso-propyl (meth)acrylate, n-butyl (meth) acrylate, isobutyl (meth)acrylate, tert-butyl (meth)acrylate. More preferably, the vinyl comonomer residue is selected from a residue of methyl acrylate, ethyl acrylate, n-propyl acrylate, iso-propyl acrylate, n-butyl acrylate, iso-butyl acrylate, and t-butyl acrylate. Most preferably methyl acrylate, n-butyl acrylate or ethyl acrylate.

Typically, the acrylic (co)polymer of any aspect of the present invention is an acrylic copolymer. Preferably, the acrylic copolymer comprises >0% to 70 wt % vinyl comonomer residue. Suitably, the acrylic copolymer is a random (or statistical), alternating or periodic copolymer. Suitably, the acrylic copolymer is not a block copolymer. Preferably, the acrylic copolymer is a random copolymer. The copolymer may essentially be a linear copolymer. By the term "random copolymer" it is meant a copolymer consisting of macromolecules in which the probability of finding a given monomeric unit at any given site in the chain is independent of the nature of the adjacent units.

The vinyl monomers may be made up of a mixture of different monomers or may be only one monomer. Generally, up to 3 other vinyl monomers may be used, more typically, 2 or most typically one.

Preferred combinations of the other vinyl monomers when more than one are maleic anhydride and styrene; methyl, n-butyl or ethyl acrylate with any of methacrylic acid, maleic anhydride and styrene, vinyl pyrrolidone, α-Methylene-γ-butyrolactone or styrene.

Fatty Acid Amide

The fatty acid amide of any aspect of the present invention may be present in an amount of between 0.1 and 20% by weight of the composition, chip, pellet, moulded article or cap layer, preferably between >0.5 and 15 wt %, more preferably between >0.75 and 12 wt %, or between >1 and 10 wt %.

Generally, preferred ranges for the fatty acid amide are usually between greater than 1 and 5 wt %, more preferably, between 1.5 and 3.5 wt % composition, chip, pellet, moulded article or cap layer. However, in a cap layer of the present invention a preferred range has been found to be between 1 and 6 wt %, more preferably, between 2 and 5 wt %. Furthermore, the inventors have surprisingly found that the preferred range for a cap layer on a non-acrylic, acrylic resin or a mixed acrylic/non-acrylic resin substrate layer is between 1 and 10 wt %, more preferably, between 2 and 9 wt %, most preferably, between 3 and 7 wt %, such as between 4 and 6 wt %. Therefore, it is preferred if the fatty acid amide is present in a cap layer applied to a non-acrylic, acrylic resin or mixed non-acrylic/acrylic resin substrate, that it is in excess of 3 wt %, more preferably, in excess of 4 wt %, most preferably, in excess of 5 wt %.

In addition, particularly in the case of non-acrylic resin substrates, it has been found that the thickness of the cap layer is also relevant to the necessary fatty acid amide loading. Therefore, the above fatty acid amide preferred values although generally useful are more especially preferred for cap layers of thickness in excess of 50 μm, more typically for thicknesses in excess of at least 50 or 80 μm, for example at least 100 μm, such as at least 180 μm, 200 μm, 220 μm, 240 μm or 250 μm. Preferred non-acrylic resin substrates for which the above thicknesses of cap layer and/or fatty acid amide levels are suitable are those defined herein.

Typically, the fatty acid amide is present in the composition of the invention at more than 0.5 wt % more typically, more than 0.75% w/w, most typically, more than 1 wt %, such as 1.5-10 wt %.

Suitably, the ratio of acrylic (co)polymer to fatty acid amide in the composition, chip, pellet, moulded article or cap layer, is between 99.9:0.1 and 80:20, such as between 99.5:0.5 and 85:15, or between 99:1 and 90:10, such as between 98.5:1.5 and 92:8, or between 98.25:1.75 and 93:7, for example between 98:2 and 93:7, or 97.5:2.5 and 94:6 or between 97:3 and 94:6.

The fatty acid amide of any aspect of the present invention may be according to Formula I:

$$R^1—CO—NR^2(R^3) \qquad \text{Formula I}$$

wherein $R^1$ is selected from optionally substituted $C_5$ to $C_{30}$ aliphatic group, such as $C_{10}$ to $C_{25}$ aliphatic group, $C_{12}$ to $C_{22}$ aliphatic group, $C_{14}$ to $C_{20}$ aliphatic group, or $C_{15}$ to $C_{19}$ aliphatic groups such as alkyl, alkenyl or alkynyl groups, $R^1$ may be linear or branched, saturated, monounsaturated or polyunsaturated, preferably $R^1$ is linear or branched and alkyl or alkenyl, more preferably $R^1$ is linear and alkyl, most preferably $R^1$ is linear and $C_{14}$ to $C_{20}$ alkyl; and $R^2$ and $R^3$ may be independently selected from hydrogen, optionally substituted aliphatic, alicyclic and aryl groups; when $R^2$ and/or $R^3$ is aliphatic then $R^2$ and/or $R^3$ may be linear or branched, saturated, monounsaturated or polyunsaturated, preferably at least one of $R^2$ and $R^3$ is hydrogen, more preferably both $R^2$ and $R^3$ are hydrogen; most preferably $R^2$ and $R^3$ are hydrogen and $R^1$ is optionally substituted $C_{14}$ to $C_{20}$, such as $C_{14}$ to $C_{20}$ alkyl, especially, unsubstituted $C_{14}$ to $C_{20}$, such as $C_{14}$ to $C_{20}$ alkyl.

The branching of the $R^1$, $R^2$ and $R^3$ groups, when aliphatic, may be monoalkyl or polyalkyl, wherein "alkyl" when used in relation to monoalkyl or polyalkyl branching means $C_1$ to $C_{15}$, such as $C_1$ to $C_{10}$, $C_1$ to $C_8$, $C_1$ to $C_5$, or $C_1$ to $C_3$. Preferably the monoalkyl branching is methyl or ethyl or propyl or optionally a mixture thereof for polyalkyl branching.

Preferably, less than 20% by weight of the fatty acid amide comprises polyalkyl branched $R^1$, R2 and R3 groups, typically less than 20% by weight of the fatty acid amide comprises branched $R^1$, R2 and R3 groups, preferably less than 15 wt % and more preferably less than 10 wt % and most preferably less than 5 wt % or less than 3 wt %.

The optional substituents for aliphatic groups in Formula I may include alicyclic (such as $C_6$ to $C_{15}$ cycloalkyl), aryl, halogen, cyano, nitro, $OR^{19}$, $OC(O)R^{20}$, $C(O)R^{21}$, $C(O)OR^{22}$, $NR^{23}R^{24}$, $C(O)NR^{25}R^{26}$, $C(S)R^{25}R^{26}$, $SR^{27}$, $C(O)SR^{27}$. Suitably, the optional substituents include $C_6$ to $C_{10}$ aryl, halogen, $OR^{19}$, $C(O)R^{21}$, and $SR^{27}$.

The optional substituents for alicyclic groups in Formula I may include alkyl (such as lower alkyl, for example $C_1$ to $C_{10}$ alkyl), alkenyl, aryl, halogen, cyano, nitro, $OR^{19}$, $OC(O)R^{20}$, $C(O)R^{21}$, $C(O)OR^{22}$, $NR^{23}R^{24}$, $C(O)NR^{25}R^{26}$, $C(S)R^{25}R^{26}$, $SR^{27}$, $C(O)SR^{27}$. Suitably, the optional substituents include $C_1$ to $C_{10}$ alkyl, $C_6$ to $C_{10}$ aryl, halogen, $OR^{19}$, $C(O)R^{21}$, and $SR^{27}$.

The optional substituents for aryl groups in Formula I may include alkyl (such as lower alkyl, for example $C_1$ to $C_{10}$ alkyl), alkenyl, halogen, cyano, nitro, $OR^{19}$, $OC(O)R^{20}$, $C(O)R^{21}$, $C(O)OR^{22}$, $NR^{23}R^{24}$, $C(O)NR^{25}R^{26}$, $C(S)R^{25}R^{26}$, $SR^{27}$, $C(O)SR^{27}$. Suitably, the optional substituents include $C_1$ to $C_{10}$ alkyl, halogen, $OR^{19}$, $C(O)R^{21}$, and $SR^{27}$.

$R^{19}$ to $R^{27}$ in relation to the optional substituents of Formula I each independently represent hydrogen, halogen, $C_1$ to $C_{10}$ alkyl, or $C_6$ to $C_{10}$ aryl.

The fatty acid amide according to Formula I may be a monoamide according to Formula I wherein $R^2$ and $R^3$ are hydrogen or a substituted amide according to Formula I wherein $R^2$ and/or $R^3$ are independently selected from an aliphatic group, alicyclic group and aryl. The fatty acid amide may be two or more amides with, for example, a first amide according to formula I and a second amide according to formula I. The first amide may be a monoamide according to Formula I wherein $R^2$ and $R^3$ are hydrogen and the second amide may be a substituted amide according to Formula I wherein $R^2$ and/or $R^3$ are independently selected from an aliphatic group, alicyclic group and aryl. The ratio of the first amide:the second amide may be between 90:10 and 99.9:0.1.

The fatty acid amide of any aspect of the present invention may be formed primarily of monoamides according to Formula I, such as at least 50% by weight of the fatty acid amides are monoamides according to Formula I, or at least 60 wt %, 70 wt %, 80 wt %, 90 wt %, 95 wt %, 97 wt %, 98 wt % or 99 wt %, or at least 99.25 wt %. 99.5 wt %, 99.9 wt %, 99.99 wt % or 100 wt %.

The monoamide according to Formula I may be selected from one or more of dodecanamide, palmitamide, oleamide, stearamide, erucamide and behenamide. Preferably, the monoamide according to Formula I may be selected from one or more of oleamide or stearamide, more preferably stearamide.

A second or further fatty acid amide of any aspect of the present invention may comprise between 0 and 50% by weight of the fatty acid amide content such as between 0.01 and 50 wt %, or between 0.1 and 40 wt %, between 0.1 and 30 wt %, between 0.1 and 20 wt %, between 0.1 and 10 wt %, or 0.5 and 5 wt %, or between 0.75 and 3 wt % or between 1 and 2 wt %.

The substituted amide of any aspect of the present invention may be selected from one or more of oleyl palmitamide, stearyl stearamide, stearyl erucamide, and erucyl erucamide.

Fatty acid amides are well known in the art. Fatty acid amides are generally formed from fatty acids using techniques known in the art.

Additives

Other optional additives which may be present in the composition, chip, pellet, or moulded article include: colour concentrates such as dyes and pigments; lubricants; UV stabilisers; thermal stabilisers; processing aids; antioxidants; flame retardants; antistatic agents; particulate fillers such as talc, glass beads, titanium dioxide and calcium carbonate; PTFE and impact modifiers which are relatively more rubbery (co)polymers including core-shell impact modifiers. When impact modifiers are present these are taken to be additional to the acrylic (co)polymer of the present invention. The total amount of optional additives will generally not exceed 15 or 20% by weight based on the total weight of the composition, chip, pellet or moulded article.

The composition, chip, pellet or moulded article may comprise a pigment in the amount of between 0.0001 and 15 wt % based on the total weight of the composition, chip, pellet, or moulded article, such as between 0.0005 and 10 wt %, or between 0.001 and 5 wt % or between 0.001 and 2 wt % or between 0.002 and 1.5 wt %, or between 0.003 and 1 wt % of between 0.004 and 0.75 wt %, such as between 0.005 and 0.5 wt %.

Suitably, a composition, chip or pellet for injection moulding, or an injection moulded article comprise pigment in the amount of between 0.0001 and 5 wt % based on the total weight of the composition, chip, pellet, or moulded article, such as between 0.0002 and 4 wt % or between 0.0005 and 3 wt % or between 0.001 and 2.5 wt %, such as 0.002 and 2 wt %.

Suitably, a composition, chip or pellet for co-extrusion, or a co-extruded article comprise pigment in the amount of between 1 and 15 wt % based on the total weight of the composition, chip, pellet, or article, such as between 1.5 and 12 wt % or between 2 and 10 wt % or between 3 and 8 wt %, such as 4 and 6 wt %.

The compositions of the present invention have exceptional clarity. Some comonomers must be excluded to avoid introducing opaqueness into the final product. Specifically, the composition is free from copolymers of ethylene and at least 1 type of vinyl monomer other than such a copolymer that is an ethylene alpha olefin copolymer rubber or ethylene alpha olefin nonconjugated diene copolymer rubber. Optionally, the composition may be free from ethylene alpha olefin copolymer rubber or ethylene alpha olefin nonconjugated diene copolymer rubber.

Definitions

The term "monomer residues" and "comonomer residues" are terms well known to those skilled in the art and may refer to a moiety in an oligomer or polymer that was formed from a monomer of the named compound, for example MMA.

The term "vinyl" is well known to those skilled in the art and may refer to a $C_2$ double bonded functional group. The group is equivalent to ethylene, minus one hydrogen atom. The "vinyl" term can also refer to any compound containing that group, for example PVC. However, with reference to the composition being free from copolymers of ethylene and at least 1 type of vinyl monomer other than such a copolymer that is an ethylene alpha olefin copolymer rubber or ethylene alpha olefin nonconjugated diene copolymer rubber, the vinyl monomer examples may be (meth)acrylate compounds such as methyl (meth)acrylate, ethyl (meth)acrylate, n-propyl (meth)acrylate, iso-propyl (meth)acrylate, n-butyl (meth)acrylate, iso-butyl (meth)acrylate, sec-butyl (meth) acrylate, tert-butyl (meth)acrylate, n-hexyl (meth)acrylate, cyclohexyl (meth)acrylate, n-octyl (meth)acrylate, 2-ethyl hexyl (meth)acrylate, dodecyl (meth)acrylate, and glycidyl (meth)acrylate; (meth)acrylic acid; and vinyl carboxylate compounds such as vinyl acetate and vinyl butyrate.

The term "ethylene alpha olefin copolymer rubber" refers to a copolymer that comprises of, in polymerised form, ethylene monomer and an alpha olefin as the only two repeating units.

The term "ethylene alpha olefin nonconjugated diene copolymer rubber" refers to a copolymer that comprises, in polymerised form, ethylene, an alpha olefin, and a nonconjugated diene as the only repeating units.

The use of the term (alk), (meth) etc in (alk)acrylate, (alk)acrylic, (meth)acrylate, (meth)acrylic or the like refers to the optional inclusion of the "alk" or "meth" group respectively. In other words, the term "alkyl (alk)acrylate" refers to either an alkyl alkacrylate or an alkyl acrylate. Similarly, a "(co)polymer" may be a homo-, co-, ter- or higher copolymer and merely refers to the absence of or presence of one or more types of comonomer residues in the polymer.

For the avoidance of doubt, when the comonomer residue of the acrylic (co)polymer is an alkacrylic acid or ester comonomer residue, the alkacrylic acid or ester of the monomer and the alkacrylic acid or ester of the comonomer are different. General references to "acrylic (co)polymer" herein refer to an (alk)acrylic acid or ester monomer residue containing polymer.

The acrylic (co)polymer herein has more than 50 wt % acrylic monomer residues, more typically, at least 60 wt %, most typically, at least 70 wt % acrylic monomer residues. Therefore, such residues are more typically (alk)acrylic acid or ester monomer residues as defined herein.

The compositions of the present invention when containing more than 50% w/w composition of acrylic monomer derived polymer residues is an acrylic composition. Therefore, such residues are more typically (alk)acrylic acid or ester monomer residues as defined herein. Accordingly, it is preferred that the compositions of the present invention are acrylic compositions.

The term aliphatic herein means a hydrocarbon moiety that may be straight chain or branched and may be completely saturated, or contain one or more units of unsaturation, but which is not aromatic. The term "unsaturated" means a moiety that has one or more double and/or triple bonds. The term "aliphatic" is therefore intended to encompass alkyl, alkenyl or alkynyl groups. An aliphatic group is preferably a $C_{1-22}$ aliphatic group, that is, an aliphatic group with 1, 2, 3, 4, 5, 6, 7, 8, 9, 10, 11, 12, 13, 14, 15, 16, 17, 18, 19, 20, 21 or 22 carbon atoms. Preferably, an aliphatic group is a $C_{1-15}$ aliphatic, more preferably a $C_{1-12}$ aliphatic, more preferably a $C_{1-10}$ aliphatic, even more preferably a $C_{1-6}$aliphatic, such as a $C_{1-4}$ aliphatic group.

An alkyl group is preferably a "$C_{1-22}$ alkyl group", that is an alkyl group that is a straight or branched chain with 1 to 22 carbons. The alkyl group therefore has 1, 2, 3, 4, 5, 6, 7, 8, 9, 10, 11, 12, 13, 14, 15, 16, 17, 18, 19, 20.21 or 22 carbon atoms. Preferably, an alkyl group is a $C_{1-15}$ alkyl, preferably a $C_{1-12}$ alkyl, more preferably a $C_{1-10}$ alkyl, even more preferably a $C_{1-6}$ alkyl, even more preferably a $C_{1-4}$ alkyl group. Specifically, examples of "$C_{1-20}$ alkyl group" include methyl group, ethyl group, n-propyl group, iso-propyl group, n-butyl group, iso-butyl group, sec-butyl group, tert-butyl group, n-pentyl group, n-hexyl group, n-heptyl group, n-octyl group, n-nonyl group, n-decyl group, n-undecyl group, n-dodecyl group, n-tridecyl group, n-tetradecyl group, n-pentadecyl group, n-hexadecyl group, n-heptadecyl group, n-octadecyl group, n-nonadecyl group, n-eicosyl group, 1,1-dimethylpropyl group, 1,2-dimethylpropyl group, 2,2-dimethylpropyl group, 1-ethylpropyl group, n-hexyl group, 1-ethyl-2-methylpropyl group, 1,1,2-trimethylpropyl group, 1-ethylbutyl group, 1-methylbutyl group, 2-methylbutyl group, 1,1-dimethylbutyl group, 1,2-dimethylbutyl group, 2,2-dimethylbutyl group, 1,3-dimethylbutyl group, 2,3-dimethylbutyl group, 2-ethylbutyl group, 2-methylpentyl group, 3-methylpentyl group and the like, and isomers thereof.

Alkenyl and alkynyl groups are preferably "$C_{2-22}$ alkenyl" and "$C_{2-22}$ alkynyl", more preferably "$C_{2-15}$ alkenyl" and "$C_{2-15}$ alkynyl", even more preferably "$C_{2-12}$ alkenyl" and "$C_{2-12}$ alkynyl", even more preferably "$C_{2-10}$ alkenyl" and "$C_{2-10}$ alkynyl", even more preferably "$C_{2-6}$ alkenyl" and "$C_{2-6}$ alkynyl", most preferably "$C_{2-4}$ alkenyl" and "$C_{2-4}$ alkynyl" groups, respectively.

Alkylene is divalent but otherwise defined as an alkyl group above. Likewise, alkenylene and alkynylene are defined as divalent equivalents of alkenyl and alkynyl above.

Aliphatic herein includes alicyclic group which is a saturated or partially unsaturated cyclic aliphatic monocyclic or polycyclic (including fused, bridging and spirofused) ring system which has from 3 to 20 carbon atoms, that is an alicyclic group with 3, 4, 5, 6, 7, 8, 9, 10, 11, 12, 13, 14, 15, 16, 17, 18, 19 or 20 carbon atoms. Preferably, an alicyclic group has from 3 to 15, more preferably from 3 to 12, even more preferably from 3 to 10, even more preferably from 3 to 8 carbon atoms, even more preferably from 3 to 6 carbons atoms. The term "alicyclic" encompasses cycloalkyl, cycloalkenyl and cycloalkynyl groups. It will be appreciated that the alicyclic group may comprise an alicyclic ring bearing one or more linking or non-linking alkyl substituents, such as —$CH_2$-cyclohexyl. Specifically, examples of the $C_{3-20}$ cycloalkyl group include cyclopropyl, cyclobutyl, cyclopentyl, cyclohexyl, cycloheptyl, adamantly, isobornyl and cyclooctyl.

An aryl group is a monocyclic or polycyclic ring system having from 5 to 20 carbon atoms. An aryl group is preferably a "$C_{6-12}$ aryl group" and is an aryl group constituted by 6, 7, 8, 9, 10, 11 or 12 carbon atoms and includes condensed ring groups such as monocyclic ring group, or bicyclic ring group and the like. Specifically, examples of "$C_{6-10}$ aryl group" include phenyl group, biphenyl group, indenyl group, naphthyl group or azulenyl group and the like. It should be noted that condensed rings such as indan and tetrahydro naphthalene are also included in the aryl group.

The aliphatic, alkyl, alkenyl, alkynyl, alicyclic, cycloalkyl, and aryl groups groups may be interrupted by a heteroatom. Suitably, the heteroatom is selected from one or more of nitrogen, oxygen and sulphur.

The term optionally substituted herein in relation to optionally substituted aliphatic, aryl or alkyl groups of the (co)monomers of the acrylic (co)polymer includes the following substituents, cycloalkyl (such as $C_6$ to $C_{15}$ cycloalkyl), alkyl (when aryl, such as $C_1$ to $C_{10}$ alkyl), aryl (when aliphatic or alkyl, such as $C_6$ to $C_{12}$ aryl), epoxy, $OR^{19}$, $OC(O)R^{20}$, $OC(O)R^{31}C(O)R^{19}$, $C(O)R^{21}$, $C(O)OR^{22}$, $NR^{23}R^{24}$, $C(O)NR^{25}R^{26}$, N,(N'$R^{19}$)-imidazolidinone, $SR^{27}$, $S(O)_2OR^{30}$. $R^{19}$ to $R^{30}$ each independently represent hydrogen, $C_1$ to $C_{10}$ alkyl, or $C_6$ to $C_{10}$ aryl and $R^{31}$ represents a $C_1$ to $C_{10}$ alkylene. The preferred substituents are hydroxyl; epoxy; C(O)OH; $S(O)_2OH$; $NR^{23}R^{24}$; N,(N'$R^{19}$)-imidazolidinone; and $OC(O)R^{31}C(O)R^{19}$ groups. Examples of substituted monomers include 2-hydroxyethyl methacrylate, hydroxypropylethyl methacrylate, 2-hydroxyethyl acrylate, or hydroxypropyl acrylate; ethylene glycol dimethacrylate, ethylene glycol diacrylate, 1,4-butanediol dimethacrylate, 1,4-butanediol diacrylate, 1,6-hexanediol dimethacrylate and 1,6-hexanediol diacrylate, particularly the compatible acrylic crosslinking monomers; amines such as N,N-dimethylaminoethyl methacrylate, N,N-diethylaminoethyl methacrylate, t-butylaminoethyl methacrylate.

By the term 'cap layer' herein, is meant a co-extruded layer of a laminate that is intended to be located on a co-extruded substrate layer. The cap layer will usually form the layer more susceptible to scratching and abrasion in use.

Advantageously, the present invention may provide improved abrasion resistance and/or improved scratch resistance in the acrylic moulded articles.

The compositions of the present invention may be formed into a variety of forms such as moulded articles, sheet, chips or pellets. Such sheet may be formed, vacuum formed or thermoformed into other shapes. The compositions may also be coextruded or laminated onto other materials such as metals or other plastic materials. Other embodiments will be known to those skilled in the art.

All of the features contained herein may be combined with any of the above aspects in any combination.

For a better understanding of the invention, and to show how embodiments of the same may be carried into effect, reference will now be made, by way of example, to the following experimental data.

EXAMPLES

For the determination of molecular weight, samples are prepared in 2 ml autosampler vials at a concentration of the polymer of 1-2 mg/ml in THF or chloroform. The samples are agitated overnight to ensure complete dissolution. The samples are analysed using a Viscotek 302 with refractive index, viscosity and light scattering detectors and 2×300 mm PLgel 5 μm mixed C columns. The eluent is THF or chloroform with a flow rate of 1.0 ml/min and at a constant temperature of 35° C. Polymethylmethacrylate (PMMA) or polystyrene standards can be used to calibrate the gel permeation chromatography equipment.

Example compositions according to the present invention containing different types of acrylic (co)polymers with varied levels of stearamide were prepared, formed into an acrylic moulded product by injection moulding, extrusion or co-extrusion and tested for scratch and abrasion resistance. Comparative examples containing the acrylic (co)polymer but no fatty acid amide were also prepared and tested. The amide was compounded with the copolymer bead as follows:—

Compounding Processing Conditions

Extruder Werner & Pfleiderer ZSK30 Twin Screw Extruder

L/D 35:1

Zone Temperatures Z1=190, Z2=220, Z3=220, Z4=225, Z5=225, Z6=230° C.

Screw Speed 271 rpm

Output 13.9 kg/h

Screw Profile General Purpose Twin Screw with Vacuum vent zone

L/D=Length to diameter ratio of screw shaft.

The injection moulded compositions are detailed in Table 1 for Comparative Examples 1 and 2 and Examples 1 and 2.

TABLE 1

Injection moulded compositions

| | Acrylic (co)polymer | Stearamide % by weight of composition | Melt Flow Index g/10 mins |
|---|---|---|---|
| Comparative example 1 | 97% Methyl Methacrylate (MMA) 3% Ethyl Acrylate(EA) | 0 | 4.5 |
| Comparative example 2 | 98.5% MMA/ 1.5% MA | 0 | 1.9 |
| Example 1 | 97% MMA 3% EA | 2 | 7.1 |
| Example 2 | 98.5% MMA/ 1.5% MA | 2 | 3.5 |

The examples in table 1 had Mw as follows—example 1 and comparative example 1 (90K), example 2 and comparative example 2 (90K). The stearamide in solid pellet form was blended with the acrylic (co)polymer and the resulting mixture was then melt processed through an extruder. The granules obtained were injection molded into plaques (75 mm×50 mm×3 mm) for scratch and abrasion testing.

Scratch Testing

Using a Taber Linear Abrader (Model 5750) with a 1 mm Hemisphere Scratch Tip and load variants of 5N, 10N, 15N, 20N and 25N, a 30 mm scratch was made across the example plaque at a speed of 60 cycles per minute. The appearance of a scratch was determined both by visual eye and microscopy. The results can be found in Table 2.

Abrasion Testing

Using a Taber Linear Abrader (Model 5750) with a 16 mm diameter Crockmeter attachment and a fixed load of 9N, various cloth materials were rubbed across the example plaques at 40 strokes per minute. The samples are scratched/abraded 24 hrs after exposure to air. Using visual eye, the number of strokes required to form abrasion was recorded. The test was stopped at 200 strokes. The cloth materials used were AATCC Crockmeter square test cloth and Martindale Abrasion Cloth (SM25). The results can be found in Table 2.

Flexural modulus and Charpy impact strength were also tested for example 1 and comparative example 1. The results can be found in Table 3.

TABLE 2

Injection Moulding Results

| | Abrasion Resistance | | |
|---|---|---|---|
| | Crockmeter Test Cloth (AATCC) | Martindale Abrasion Cloth (SM25) | Scratch Resistance |
| Comparative example 1 | Abrasion visible at 20 strokes | Abrasion visible at 15 strokes | Scratch visible at 5N load |
| Comparative example 2 | Abrasion visible at 60 strokes | Abrasion visible at 60 strokes | Scratch visible at 15N load |
| Example 1 | None after 200 strokes | None after 200 strokes | No scratch visible at 25N load |
| Example 2 | None after 200 strokes | None after 200 strokes | No scratch visible at 25N load |

TABLE 3

Results

| | Flexural Modulus (GPa) | Charpy Impact Strength ($kj/m^2$) |
|---|---|---|
| Comparative example 1 | 3.2 | 18 |
| Example 1 | 3.5 | 19 |

Tables 1-15 herein contain injection moulded results. In all these examples injection moulding was carried out under the conditions as follows:—

Moulding Conditions for Injection Moulding

IJM Machine: Demag D40 Moulding Machine

Screw Speed: 20 rpm

Injection Speed/Time: 30%/1 s

Back Pressure: 5 bar

Holding Pressure/Time: 38 bar/15 s

Zone Temperatures: $Z_1$=220, $Z_2$=230, $Z_3$=235, Nozzle=240, Mould=60° C.

Test results for examples 3-7 are given in Table 4. The examples are an acrylic (co)polymer derived from 90% methyl methacrylate (MMA) and 10% butyl acrylate (BA) with different levels of stearamide, and a Mw of 90K.

TABLE 4

| Injection Moulding Results | | | | |
|---|---|---|---|---|
| | | Abrasion Resistance | | |
| | Stearamide % by weight of composition | Crockmeter Test Cloth (AATCC) 100 Strokes | Crockmeter Test Cloth (AATCC) 200 Strokes | Scratch Resistance |
| Example 3 | 0 | Significant abrasion | Significant abrasion | Faint scratch visible at 5N load |
| Example 4 | 0.5 | Slight abrasion | Significant abrasion | Faint scratch visible at 10N load |
| Example 5 | 2 | No abrasion | No abrasion | No scratch visible at 25N load |
| Example 6 | 5 | No abrasion | No abrasion | No scratch visible at 25N load |
| Example 7 | 10 | No abrasion | No abrasion | No scratch visible at 25N load |

The test results for examples 8-12 are given in Table 5. The examples are an acrylic (co)polymer derived from 85% MMA and 15% BA with different levels of stearamide.

TABLE 5

| Injection Moulding Results | | |
|---|---|---|
| | Stearamide % by weight of composition | Scratch Resistance |
| Example 8 | 0 | Clear scratch visible at 5N load |
| Example 9 | 2 | Faint scratch visible at 10N load |
| Example 10 | 5 | No scratch visible at 25N load |
| Example 11 | 10 | No scratch visible at 25N load |

The test results for examples 12-16 are given in Table 6. The examples are an acrylic (co)polymer derived from 97% MMA and 3% Ethyl Acrylate (EA) with different levels of stearamide. The examples had a Mw of 145K.

TABLE 6

| Injection Moulding Results | | | | |
|---|---|---|---|---|
| | | Abrasion Resistance | | |
| | Stearamide % by weight of composition | Crockmeter Test Cloth (AATCC) 100 Strokes | Crockmeter Test Cloth (AATCC) 200 Strokes | Scratch Resistance |
| Example 12 | 0 | Slight abrasion | Significant abrasion | Faint scratch visible at 10N load |

TABLE 6-continued

| Injection Moulding Results | | | | |
|---|---|---|---|---|
| | | Abrasion Resistance | | |
| | Stearamide % by weight of composition | Crockmeter Test Cloth (AATCC) 100 Strokes | Crockmeter Test Cloth (AATCC) 200 Strokes | Scratch Resistance |
| Example 13 | 0.5 | Slight abrasion | Significant abrasion | Faint scratch visible at 15N load |
| Example 14 | 2 | No abrasion | No abrasion | No scratch visible at 25N load |
| Example 15 | 5 | No abrasion | No abrasion | No scratch visible at 25N load |
| Example 16 | 10 | No abrasion | No abrasion | No scratch visible at 25N load |

The test results for examples 17-21 are given in Table 7. These examples are an acrylic (co)polymer derived from 95% MMA and 5% EA with different levels of stearamide. The examples had a Mw of 130K.

TABLE 7

| Injection Moulding Results | | | | |
|---|---|---|---|---|
| | | Abrasion Resistance | | |
| | Stearamide % by weight of composition | Crockmeter Test Cloth (AATCC) 100 Strokes | Crockmeter Test Cloth (AATCC) 200 Strokes | Scratch Resistance |
| Example 17 | 0 | Slight abrasion | Significant abrasion | Faint scratch visible at 10N load |
| Example 18 | 0.5 | Slight abrasion | Significant abrasion | Faint scratch visible at 15N load |
| Example 19 | 2 | No abrasion | No abrasion | No scratch visible at 25N load |
| Example 20 | 5 | No abrasion | No abrasion | No scratch visible at 25N load |
| Example 21 | 10 | No abrasion | No abrasion | No scratch visible at 25N load |

The test results for examples 22-26 are given in Table 8. These examples are an acrylic (co)polymer derived from 98.5% MMA and 1.5% methyl acrylate (MA) with different levels of stearamide and a MW of 90K.

TABLE 4

| Injection Moulding Results | | | | |
|---|---|---|---|---|
| | | Abrasion Resistance | | |
| | Stearamide % by weight of composition | Crockmeter Test Cloth (AATCC) 100 Strokes | Crockmeter Test Cloth (AATCC) 200 Strokes | Scratch Resistance |
| Example 22 | 0 | Significant abrasion | Significant abrasion | Faint scratch visible at 10N/15N load |
| Example 23 | 0.5 | Slight abrasion | Significant abrasion | Faint scratch visible at 10N/15N load |

TABLE 4-continued

| Injection Moulding Results | | | | |
|---|---|---|---|---|
| | | Abrasion Resistance | | |
| | Stearamide % by weight of composition | Crockmeter Test Cloth (AATCC) 100 Strokes | Crockmeter Test Cloth (AATCC) 200 Strokes | Scratch Resistance |
| Example 24 | 2 | No abrasion | Very slight abrasion | No scratch visible at 25N load |
| Example 25 | 5 | No abrasion | No abrasion | No scratch visible at 25N load |
| Example 26 | 10 | No abrasion | No abrasion | No scratch visible at 25N load |

The test results for examples 27-31 are given in Table 9. These examples are an acrylic (co)polymer derived from 90% MMA and 10% MA with different levels of stearamide and a MW of 92K.

TABLE 9

| Injection Moulding Results | | | | |
|---|---|---|---|---|
| | | Abrasion Resistance | | |
| | Stearamide % by weight of composition | Crockmeter Test Cloth (AATCC) 100 Strokes | Crockmeter Test Cloth (AATCC) 200 Strokes | Scratch Resistance |
| Example 27 | 0 | Significant abrasion | Significant abrasion | Faint scratch visible at 10N/15N load |
| Example 28 | 0.5 | Slight abrasion | Significant abrasion | Faint scratch visible at 10N/15N load |
| Example 29 | 2 | No abrasion | Slight abrasion | No scratch visible at 25N load |
| Example 30 | 5 | No abrasion | No abrasion | No scratch visible at 25N load |
| Example 31 | 10 | No abrasion | No abrasion | No scratch visible at 25N load |

The test results for examples 32-36 are given in Table 10. These examples are an acrylic (co)polymer derived from 87% MMA and 13% MA, with different levels of stearamide and a MW of 80K.

TABLE 5

| Injection Moulding Results | | | | |
|---|---|---|---|---|
| | | Abrasion Resistance | | |
| | Stearamide % by weight of composition | Crockmeter Test Cloth (AATCC) 100 Strokes | Crockmeter Test Cloth (AATCC) 200 Strokes | Scratch Resistance |
| Example 32 | 0 | Significant abrasion | Significant abrasion | Faint scratch visible at 10N/15N load |
| Example 33 | 0.5 | Slight abrasion | Significant abrasion | Faint scratch visible at 15N load |
| Example 34 | 2 | No abrasion | Slight abrasion | No scratch visible at 25N load |

TABLE 5-continued

| Injection Moulding Results | | | | |
|---|---|---|---|---|
| | | Abrasion Resistance | | |
| | Stearamide % by weight of composition | Crockmeter Test Cloth (AATCC) 100 Strokes | Crockmeter Test Cloth (AATCC) 200 Strokes | Scratch Resistance |
| Example 35 | 5 | No abrasion | No abrasion | No scratch visible at 25N load |
| Example 36 | 10 | No abrasion | No abrasion | No scratch visible at 25N load |

The test results for examples 37-41 are given in Table 11. The examples are an acrylic (co)polymer derived from 97% MMA and 3% EA, with different levels of stearamide. The examples had a Mw of 90K.

TABLE 11

| Injection Moulding Results | | | | |
|---|---|---|---|---|
| | | Abrasion Resistance | | |
| | Stearamide % by weight of composition | Crockmeter Test Cloth (AATCC) 100 Strokes | Crockmeter Test Cloth (AATCC) 200 Strokes | Scratch Resistance |
| Example 37 | 0 | Significant abrasion | Significant abrasion | Faint scratch visible at 5N load |
| Example 38 | 0.5 | Slight abrasion | Significant abrasion | Faint scratch visible at 10N load |
| Example 39 | 2 | No abrasion | No abrasion | No scratch visible at 25N load |
| Example 40 | 5 | No abrasion | No abrasion | No scratch visible at 25N load |
| Example 41 | 10 | No abrasion | No abrasion | No scratch visible at 25N load |

Example 39 is equivalent to example 1

Further examples 42-62 were prepared using different fatty acid amides. The results for the respective fatty acid amides at different levels are shown in Tables 12-17. In examples 42-62, the acrylic (co)polymer is derived from 97% methyl methacrylate (MMA) and 3% ethyl acrylate (EA). The examples had a Mw of 90K.

TABLE 12

| Injection Moulding Results (Lauramide) | | | | |
|---|---|---|---|---|
| | Lauramide | Abrasion Resistance | | |
| | Saturated (C12) % by weight of composition | Crockmeter Test Cloth (AATCC) 100 Strokes | Crockmeter Test Cloth (AATCC) 200 Strokes | Scratch Resistance |
| Example 42 | 0.5 | Slight abrasion | Significant abrasion | Faint scratch visible at 5N load |
| Example 43 | 1 | Slight abrasion | Significant abrasion | Faint scratch visible at 15N load |

TABLE 12-continued

| Injection Moulding Results (Lauramide) | | | | |
|---|---|---|---|---|
| | Lauramide | Abrasion Resistance | | |
| | Saturated (C12) % by weight of composition | Crockmeter Test Cloth (AATCC) 100 Strokes | Crockmeter Test Cloth (AATCC) 200 Strokes | Scratch Resistance |
| Example 44 | 2 | No abrasion | Very slight abrasion | No scratch visible at 25N load |
| Example 45 | 5 | No abrasion | No abrasion | No scratch visible at 25N load |

TABLE 13

| Injection Moulding Results (Palmitamide) | | | | |
|---|---|---|---|---|
| | (Palmitamide) | Abrasion Resistance | | |
| | Saturated (C16) % by weight of composition | Crockmeter Test Cloth (AATCC) 100 Strokes | Crockmeter Test Cloth (AATCC) 200 Strokes | Scratch Resistance |
| Example 46 | 0.5 | Slight abrasion | Significant abrasion | Faint scratch visible at 10N load |
| Example 47 | 1 | Slight abrasion | Slight abrasion | Faint scratch visible at 25N load |
| Example 48 | 2 | No abrasion | No abrasion | No scratch visible at 25N load |
| Example 49 | 5 | No abrasion | No abrasion | No scratch visible at 25N load |

TABLE 14

| Injection Moulding Results (Oleamide) | | | | |
|---|---|---|---|---|
| | (Oleamide) | Abrasion Resistance | | |
| | Unsaturated (C18) % by weight of composition | Crockmeter Test Cloth (AATCC) 100 Strokes | Crockmeter Test Cloth (AATCC) 200 Strokes | Scratch Resistance |
| Example 50 | 0.5 | Slight abrasion | Significant abrasion | Faint scratch visible at 5N load |

TABLE 15

| Injection Moulding Results (Erucamide) | | | | |
|---|---|---|---|---|
| | (Erucamide) | Abrasion Resistance | | |
| | Unsaturated (C22) % by weight of composition | Crockmeter Test Cloth (AATCC) 100 Strokes | Crockmeter Test Cloth (AATCC) 200 Strokes | Scratch Resistance |
| Example 51 | 0.5 | Significant abrasion | Significant abrasion | Faint scratch visible at 10N load |
| Example 52 | 1 | Significant abrasion | Significant abrasion | Faint scratch visible at 10N load |
| Example 53 | 2 | Slight abrasion | Slight abrasion | Faint scratch visible at 15N load |
| Example 54 | 5 | No abrasion | No abrasion | No scratch visible at 25N load |

Various co-extruded compositions were tested with the composition of the invention used as the cap layer and ABS used as the substrate. Various thicknesses of a 97% MMA/3% EA polymer at two different molecular weights were tested with and without 5% w/w stearamide and compositions and results are detailed in Tables 16-19. The co-extrusion conditions were as follows:—

Co-Extrusion Processing Conditions

Extruder (ABS): Single Screw Bone Craven Extruder

Screw Speed: 25 rpm

Screw Diameter: 1.75 in

Zone Temperatures ° C.: Z1=200, Z2=225, Z3=240, Die (Top)=240, Die (Bottom)=240

Screw Profile: General Purpose Single Screw

Extruder (Acrylic): Single screw Betol Extruder

Screw Speed: 8-12 rpm

Screw Diameter: 1 in

Zone Temperatures ° C.: Z1=190, Z2=215, Z3=230, Adaptor=215

Roll Stack: Killion 3 Roll Stack

Roll Temperatures ° C.: Top Roll=100, Middle Roll=85, Bottom Roll=75

Line Speed: 0.5 m/min

Screw Profile: General Purpose Single Screw

TABLE 16

| Co-extruded cap layer compositions | | | | | | |
|---|---|---|---|---|---|---|
| | Base Polymer | Stearamide % by weight of the composition | Melt Flow Index of acrylic cap composition | Substrate | Mw | Cap thickness (μm) |
| Example 55 | 97% MMA 3% EA | 5 | 4.4 | ABS | 145K | 70 |
| Example 56 | 97% MMA 3% EA | 5 | 4.4 | ABS | 145K | 150 |

TABLE 16-continued

| Co-extruded cap layer compositions | | | | | | |
|---|---|---|---|---|---|---|
| | Base Polymer | Stearamide % by weight of the composition | Melt Flow Index of acrylic cap composition | Substrate | Mw | Cap thickness (μm) |
| Example 57 | 97% MMA 3% EA | 5 | 4.4 | ABS | 145K | 250 |
| Example 58 | 97% MMA 3% EA | 5 | 4.4 | ABS | 145K | 500 |
| Example 59 | 97% MMA 3% EA | 5 | 4.4 | ABS | 145K | 800 |
| Comparative Example to example 55 | 97% MMA 3% EA | 0 | 0.9 | ABS | 145K | 70 |
| Comparative Example to example 56 | 97% MMA 3% EA | 0 | 0.9 | ABS | 145K | 150 |
| Comparative Example to example 57 | 97% MMA 3% EA | 0 | 0.9 | ABS | 145K | 250 |
| Comparative Example to example 58 | 97% MMA 3% EA | 0 | 0.9 | ABS | 145K | 500 |
| Comparative Example to example 59 | 97% MMA 3% EA | 0 | 0.9 | ABS | 145K | 800 |

Abrasion Testing

Using a Taber Linear Abrader (Model 5750) with a 16 mm diameter Crockmeter attachment and a fixed load of 9N, various cloth materials were rubbed across the samples at 40 strokes per minute. The samples are scratched/abraded 24 hrs after exposure to air. Using visual eye, the appearance of damage after 400 strokes was recorded. The cloth materials used were AATCC Crockmeter square test cloth and Martindale Abrasion Cloth (SM25).

Scratch Testing

Using a Taber Linear Abrader (Model 5750) with a 1 mm Hemisphere Scratch Tip and load variants of 5N, 10N, 15N, 20N and 25N, a 60 mm scratch was made across the sample specimen at a speed of 60 cycles per minute. The samples are scratched/abraded 24 hrs after exposure to air. The appearance of a scratch was determined both by visual eye and microscopy. The scratch and abrasion results for the various compositions can be found in Tables 17, 19, 20 and 21.

TABLE 17

| Co-extruded - cap layer performance results | | | | |
|---|---|---|---|---|
| | Abrasion Resistance | | | |
| | Crockmeter Test Cloth (AATCC) 100 Strokes | Crockmeter Test Cloth (AATCC) 200 Strokes | Crockmeter Test Cloth (AATCC) 500 Strokes | Scratch Resistance |
| Example 55 | No abrasion | Slight abrasion | Significant abrasion | Visible Scratch at 5N load |
| Example 56 | No abrasion | Slight abrasion | Significant abrasion | Visible Scratch at 15N load |
| Example 57 | No abrasion | No abrasion | Slight abrasion | Visible Scratch at 25N load |

TABLE 17-continued

| Co-extruded - cap layer performance results | | | | |
|---|---|---|---|---|
| | Abrasion Resistance | | | |
| | Crockmeter Test Cloth (AATCC) 100 Strokes | Crockmeter Test Cloth (AATCC) 200 Strokes | Crockmeter Test Cloth (AATCC) 500 Strokes | Scratch Resistance |
| Example 58 | No abrasion | No abrasion | Slight abrasion | No Scratch visible at 25N load |
| Example 59 | No abrasion | No abrasion | No abrasion | No Scratch visible at 25N load |
| Comparative Example to Example 55 | Slight abrasion | Significant abrasion | Significant abrasion | Visible Scratch at 5N load |
| Comparative Example to Example 56 | Slight abrasion | Significant abrasion | Significant abrasion | Visible Scratch at 10N load |
| Comparative Example 57 | Slight abrasion | Significant abrasion | Significant abrasion | Visible Scratch at 10N load |
| Comparative Example to Example 58 | Slight abrasion | Significant abrasion | Significant abrasion | Visible Scratch at 15N load |
| Comparative Example to Example 59 | Slight abrasion | Significant abrasion | Significant abrasion | Visible Scratch at 15N load |

TABLE 18

| Co-extruded cap layer compositions | | | | | | |
|---|---|---|---|---|---|---|
| | Base Polymer | Stearamide % by weight of the composition | Melt Flow Index of acrylic cap composition | Substrate | Mw | Cap thickness (μm) |
| Example 60 | 97% MMA 3% EA | 5 | 14.5 | ABS | 90K | 70 |
| Example 61 | 97% MMA 3% EA | 5 | 14.5 | ABS | 90K | 150 |
| Example 62 | 97% MMA 3% EA | 5 | 14.5 | ABS | 90K | 250 |
| Comparative Example to Example 60 | 97% MMA 3% EA | 0 | 4.6 | ABS | 90K | 70 |
| Comparative Example to Example 61 | 97% MMA 3% EA | 0 | 4.6 | ABS | 90K | 150 |
| Comparative Example to Example 62 | 97% MMA 3% EA | 0 | 4.6 | ABS | 90K | 250 |

TABLE 19

| Co-extruded results - cap layer performance | | | | |
|---|---|---|---|---|
| | Abrasion Resistance | | | |
| | Crockmeter Test Cloth (AATCC) 100 Strokes | Crockmeter Test Cloth (AATCC) 200 Strokes | Crockmeter Test Cloth (AATCC) 500 Strokes | Scratch Resistance |
| Comparative Example to Example 60 | Slight abrasion | Significant abrasion | Significant abrasion | Visible Scratch at 5N load |
| Comparative Example to Example 61 | Slight abrasion | Significant abrasion | Significant abrasion | Visible Scratch at 10N load |
| Comparative Example to Example 62 | Slight abrasion | Significant abrasion | Significant abrasion | Visible Scratch at 10N load |
| Example 60 | Slight abrasion | Significant abrasion | Significant abrasion | Visible Scratch at 5N load |
| Example 61 | No abrasion | Slight abrasion | Significant abrasion | Visible Scratch at 15N load |

TABLE 19-continued

| Co-extruded results - cap layer performance | | | | |
|---|---|---|---|---|
| | Abrasion Resistance | | | |
| | Crockmeter Test Cloth (AATCC) 100 Strokes | Crockmeter Test Cloth (AATCC) 200 Strokes | Crockmeter Test Cloth (AATCC) 500 Strokes | Scratch Resistance |
| Example 62 | No abrasion | No abrasion | Slight abrasion | Visible Scratch at 25N load |

Two extruded polymer compositions (95% MMA/5% EA and 97% MMA/3% EA) were tested at various levels of stearamide. The extruded compositions and results are shown below in Tables 20 and 21. The extrusion conditions were as follows:—

Single Extrusion Processing conditions

Extruder (Acrylic): Single Screw Bone Craven Extruder

Screw Speed: 25 rpm

Screw Diameter: 1.75 in

Zone Temperatures ° C.: Z1=190, Z2=215, Z3=230, Die (Top)=230, Die (Bottom)=230

Screw Profile: General Purpose Single Screw

Roll Stack: Killion 3 Roll Stack

Roll Temperatures ° C.: Top Roll=100, Middle Roll=85, Bottom Roll=75

Line Speed: 0.5 m/min

TABLE 20

| Extruded compositions and results | | | | | | | |
|---|---|---|---|---|---|---|---|
| | | | | | Abrasion Resistance | | |
| | Base Polymer | stearamide % by weight of the composition | Melt Flow Index of acrylic composition | Mw | Crockmeter Test Cloth (AATCC) 100 Strokes | Crockmeter Test Cloth (AATCC) 200 Strokes | Scratch Resistance |
| Example 63 | 95% MMA 5% EA | 0 | 1.7 | 130K | Slight abrasion | Significant abrasion | Faint Scratch visible at 15N load |

TABLE 20-continued

| Extruded compositions and results | | | | | | | |
|---|---|---|---|---|---|---|---|
| | | | | | Abrasion Resistance | | |
| | Base Polymer | stearamide % by weight of the composition | Melt Flow Index of acrylic composition | Mw | Crockmeter Test Cloth (AATCC) 100 Strokes | Crockmeter Test Cloth (AATCC) 200 Strokes | Scratch Resistance |
| Example 64 | 95% MMA 5% EA | 1 | 2.2 | 130K | No abrasion | Slight abrasion | Faint Scratch visible at 15N load |
| Example 65 | 95% MMA 5% EA | 2 | 3 | 130K | No abrasion | No abrasion | No Scratch visible at 25N load |
| Example 66 | 95% MMA 5% EA | 5 | 6.4 | 130K | No abrasion | No abrasion | No Scratch visible at 25N load |

TABLE 21

| Extruded compositions and results | | | | | | | |
|---|---|---|---|---|---|---|---|
| | | | | | Abrasion Resistance | | |
| | Base Polymer | stearamide % by weight of the composition | Melt Flow Index of acrylic composition | Mw | Crockmeter Test Cloth (AATCC) 100 Strokes | Crockmeter Test Cloth (AATCC) 200 Strokes | Scratch Resistance |
| Example 67 | 97% MMA 3% EA | 0 | 0.9 | 145K | Slight abrasion | Significant abrasion | Faint Scratch visible at 15N load |
| Example 68 | 97% MMA 3% EA | 0.5 | 1 | 145K | Slight abrasion | Slight abrasion | Faint Scratch visible at 15N load |
| Example 69 | 97% MMA 3% EA | 1 | 1.1 | 145K | No abrasion | Slight abrasion | Faint Scratch visible at 15N load |
| Example 70 | 97% MMA 3% EA | 2 | 1.5 | 145K | No abrasion | No abrasion | No Scratch visible at 25N load |
| Example 71 | 97% MMA 3% EA | 5 | 3.6 | 145K | No abrasion | No abrasion | No Scratch visible at 25N load |

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A composition comprising:

(a) an acrylic (co)polymer and (b) a fatty acid amide wherein at least 75 wt % of the acrylic (co)polymer residues are methyl methacrylate and 0 to 25 wt % are residues of one or more other vinyl comonomers and wherein the composition is free from copolymers of ethylene and at least one type of vinyl monomer other than such a copolymer that is an ethylene alpha olefin copolymer rubber or ethylene alpha olefin nonconjugated diene copolymer rubber, and wherein the fatty acid amide is present in an amount of between 1 and [10] *9* wt % of the composition;

and wherein the acrylic (co)polymer is present in the composition in an amount of at least 91 wt % of the composition.

2. A process for the production of a composition according to claim 1 comprising the steps:

a. melt blending the fatty acid amide with the acrylic (co)polymer or b. adding the fatty acid amide to the monomer during production of the acrylic (co)polymer.

3. An acrylic chip or pellet for injection moulding, extrusion or co-extrusion comprising a composition according to claim 1.

4. A process for the production of a polymer article comprising the step:

a. injection moulding, extruding or co-extruding a composition according to claim 1 to form a moulded article.

5. A co-extruded laminate comprising a cap layer comprising a composition according to claim 1.

6. A moulded acrylic article comprising a composition according to claim 1.

7. A co-extruded laminate according to claim [6] *5*, wherein the cap layer has a thickness of at least 50 μm.

8. A co-extruded laminate according to claim [6] *5*, wherein the cap layer has a thickness of less than 1 mm.

9. A composition according to claim 1, wherein the acrylic (co)polymer is present in the composition in an amount of between 91 and 99.9% by weight of the composition.

10. A composition according to claim 1, wherein at least 80 wt % of the residues of the acrylic (co)polymer are residues of methyl methacrylate.

11. A composition according to claim 1, wherein the other vinyl comonomer residues may be present in the acrylic (co)polymer in an amount of between 0.1 and 25 wt %.

12. A composition according to claim 1, wherein the one or more other vinyl comonomers are selected from optionally substituted alkyl (alk)acrylate, (C1-C22)alkyl ((C0-C10)alk)acrylate, ((C0-C10)alk)acrylic acid, methyl methacrylate, ethyl methacrylate, methyl acrylate, ethyl acrylate, n-butyl acrylate, iso-butyl acrylate, n-butyl methacrylate, iso-butyl methacrylate, hexyl methacrylate, hexyl acrylate, 2-ethylhexyl methacrylate, 2-ethylhexyl acrylate, lauryl methacrylate, lauryl acrylate, stearyl methacrylate, stearyl acrylate, methacrylic acid, acrylic acid, carboxyl functional (alk)acrylates, 2-carboxyethylacrylate, hydroxy-functional (alk)acrylates, 2-hydroxyethyl methacrylate, hydroxypropylmethacrylate, hydroxypropylethyl methacrylate, 2-hydroxyethyl acrylate, hydroxypropyl acrylate, sulpho esters, sulphonyl functional (alk)acrylates, 2-sulphoethylmethacrylate, amino functional (alk)acrylates, N'N-dimethylaminoethyl methacrylate, N-t-butylaminoethyl methacrylate, N',N-diethylaminoethyl methacrylate, epoxy functional (alk)acrylates, glycidyl methacrylate, 1-(2-methacryloxyethyl) imidazolidin-2-one, acetoacetoxy functional (alk) acrylates, 2-aceto acetoxy ethylmethacrylate, carboxylic acids, crotonic acid, fumaric acid, maleic acid, itaconic acid, vinyl compounds, styrene, alphamethylstyrene, vinyl pyrrolidone, vinyl pyridine, vinyl acetate, monomethyl maleate, monomethyl itaconate, monobutyl maleate, α-methylene-γ-butyrolactone, itaconic anhydride, maleic anhydride, allyl methacrylate, divinyl benzene, ethylene glycol dimethacrylate, ethylene glycol diacrylate, 1,4-butanediol dimethacrylate, 1,4-butanediol diacrylate, 1,6-hexanediol dimethacrylate, and 1,6-hexanediol diacrylate.

13. A composition according to claim 1, wherein the acrylic (co)polymer is an acrylic copolymer.

14. A composition according to claim 1, wherein the fatty acid amide is present in an amount of between 1.5 and 10% by weight of the composition.

15. A composition according to claim 1, wherein the ratio of acrylic (co)polymer to fatty acid amide in the composition is between 99:1 and 90:10.

16. A composition according to claim 1, wherein at least 50% by weight of the fatty acid amides are according to Formula I:

$$R^1—CO—NR^2(R^3) \qquad \text{Formula I}$$

wherein $R^1$ is an optionally substituted $C_5$ to $C_{30}$ aliphatic group, wherein $R^1$ may be linear or branched, saturated, monounsaturated or polyunsaturated; and $R^2$ and $R^3$ are selected from hydrogen, optionally substituted aliphatic, alicyclic and aryl groups; when $R^2$ or $R^3$ is aliphatic then $R^2$ or $R^3$ is linear or branched, saturated, monounsaturated or polyunsaturated.

17. A composition according to claim 16 wherein the monoamide according to Formula I is selected from one or more of dodecanamide, palmitamide, oleamide, stearamide, erucamide and behenamide.

18. A composition according to claim 1, wherein the fatty acid amide comprises a second fatty acid amide between 0 and 50% by weight of the fatty acid amide content.

19. A composition according to claim 1, wherein the composition is in the form of chip, pellet, moulded article or cap layer.

20. A composition according to claim 1, wherein the acrylic (co)polymer is melt processable.

21. A composition according to claim 20, wherein the weight average molecular weight (Mw) of the acrylic (co) polymer is between 50,000 daltons and 250,000 daltons.

22. A process according to claim 4, wherein the acrylic (co)polymer is melt processable.

23. A process according to claim 22, wherein the weight average molecular weight (Mw) of the acrylic (co)polymer is between 50,000 daltons and 250,000 daltons.

24. A process according to claim 2, wherein the fatty acid amide is selected from one or more of dodecanamide, palmitamide, oleamide, stearamide, erucamide and behenamide.

25. A composition according to claim 1, wherein the other vinyl comonomers are selected from methyl acrylate, ethyl acrylate and butyl acrylate.

* * * * *